United States Patent
Rao

(10) Patent No.: US 11,669,311 B2
(45) Date of Patent: Jun. 6, 2023

(54) SYSTEM AND METHOD FOR EVALUATION OF SOFTWARE CODE ABSTRACTIONS USING A DIRECTED ACYCLIC GRAPH (DAG)

(71) Applicant: ORACLE INTERNATIONAL CORPORATION, Redwood Shores, CA (US)

(72) Inventor: Swanand Rao, Newark, CA (US)

(73) Assignee: Oracle International Corporation, Redwood Shores, CA (US)

( * ) Notice: Subject to any disclaimer, the term of this patent is extended or adjusted under 35 U.S.C. 154(b) by 49 days.

(21) Appl. No.: 17/344,575

(22) Filed: Jun. 10, 2021

(65) Prior Publication Data
US 2022/0398072 A1 Dec. 15, 2022

(51) Int. Cl.
*G06F 8/41* (2018.01)
*G06F 16/901* (2019.01)

(52) U.S. Cl.
CPC .............. *G06F 8/433* (2013.01); *G06F 8/427* (2013.01); *G06F 16/9024* (2019.01)

(58) Field of Classification Search
None
See application file for complete search history.

(56) References Cited

U.S. PATENT DOCUMENTS

| | | | |
|---|---|---|---|
| 7,478,375 B1 * | 1/2009 | Kersters | G06F 8/316 717/146 |
| 7,627,861 B2 | 12/2009 | Smith et al. | |
| 8,671,105 B2 | 3/2014 | Reddy et al. | |
| 10,209,963 B2 | 2/2019 | Hutchison | |
| 2007/0005633 A1 * | 1/2007 | Ball | G06F 11/3692 707/999.102 |
| 2019/0227777 A1 * | 7/2019 | ChoFleming, Jr. | G06F 15/82 |
| 2019/0278572 A1 * | 9/2019 | Yoshida | G06F 8/75 |

OTHER PUBLICATIONS

McIntosh et al.; Identifying and Understanding Header File Hotspots in C/C++ Build Processes; Published Jul. 22, 2015; Autom Softw Eng. 23; pp. 1-29.

(Continued)

*Primary Examiner* — Qing Chen
(74) *Attorney, Agent, or Firm* — Kraguljac Law Group, LLC

(57) ABSTRACT

Systems, methods, and other embodiments associated with the valuation of software code abstractions are described. In one embodiment, the method includes generating a directed acyclic graph (DAG) comprising a vertex node, children nodes, and a plurality of edges, wherein the vertex node includes a software code abstraction. A DAG is generated for each vertex node associated with a software code abstraction. The directed acyclic graph is analyzed to determine inheritance of the software code abstraction from the vertex node to the children nodes. A weight having a numerical value is assigned to the edges located between the vertex node and the children nodes. The numerical values are parsed to determine a cumulative sum of all of the edges associated with a particular vertex node. The cumulative sums are compared to determine an impact of the software code abstraction associated with each of the vertex nodes.

20 Claims, 6 Drawing Sheets

(56) References Cited

OTHER PUBLICATIONS

Jagtap et al.; Dependency Analysis for Secured Code Level Parallelization; Dec. 11-12, 2015; Intl. Conf. on Information Security and Privacy (ICISP2015), Nagpur, India; pp. 1-7.
Nikola Petkovic; RefStratERP—A Refactoring Strategy for ERP Systems; 2017; Degree Project in Information and Communication Technology, Second Cycle, 30 Credits; Stockholm, Sweden; pp. 1-116.
Antti Viljamaa; Specifying Reuse Interfaces for Task-Oriented Framework Specialization; Department of Computer Science, Series of Publications A Report A-2006-1; University of Helsinki Finland, pp. 1-294.
Brown et al.; A Hybrid Approach to Parallel Pattern Discovery in C++; Published by IEEE; date of conference Nov. 13, 2020; pp. 1-5.

\* cited by examiner

SYSTEM AND METHOD FOR EVALUATION OF SOFTWARE CODE ABSTRACTIONS USING A DIRECTED ACYCLIC GRAPH (DAG)

BACKGROUND

Modularization is a common practice in software architectures. Modularization is a technique to divide a software system into multiple discrete and independent modules, which are expected to be capable of carrying out task(s) independently. These modules may work as basic constructs for the entire software system. In modern software development, software modularization is often achieved by providing abstractions. An abstraction is the process of removing irrelevant or unimportant information and details from a software system/object. The abstraction allows a user or other system to focus attention on details of greater importance that remain (were not removed). Higher order software modules then extend the capabilities of these base abstractions. The logic that sits behind these abstractions drives the extended functionalities. These base functionalities create tremendous value for the rest of the software system. Therefore, it is desirable to develop a system and method for valuation of such base abstractions.

Also, in production code, issues often arise because of "bugs" that may creep into the code. A software "bug" is an error, flaw, failure or fault in a computer program or system that causes it to produce an incorrect or unexpected result, or to behave in unintended ways. Currently, software bugs are "debugged" by identifying the error, the error location is then identified, the error is analyzed, and the error is fixed and validated. A disadvantage of the current method of debugging a software bug is that there are no standardized mechanisms for performing the debugging and, more often than not, the software developer has used "tribal knowledge." In other words, each software developer uses different methods and insights for debugging software. Furthermore, if a bug is not detected in a software module and that module is used in other software systems, the bug is propagated repeatedly without detection and may cause technical problems in many different areas. Additionally, it would be desirable to determine how big of an impact (commonly referred to as "impact radius") a software bug can have on software and subsequent versions of that software.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
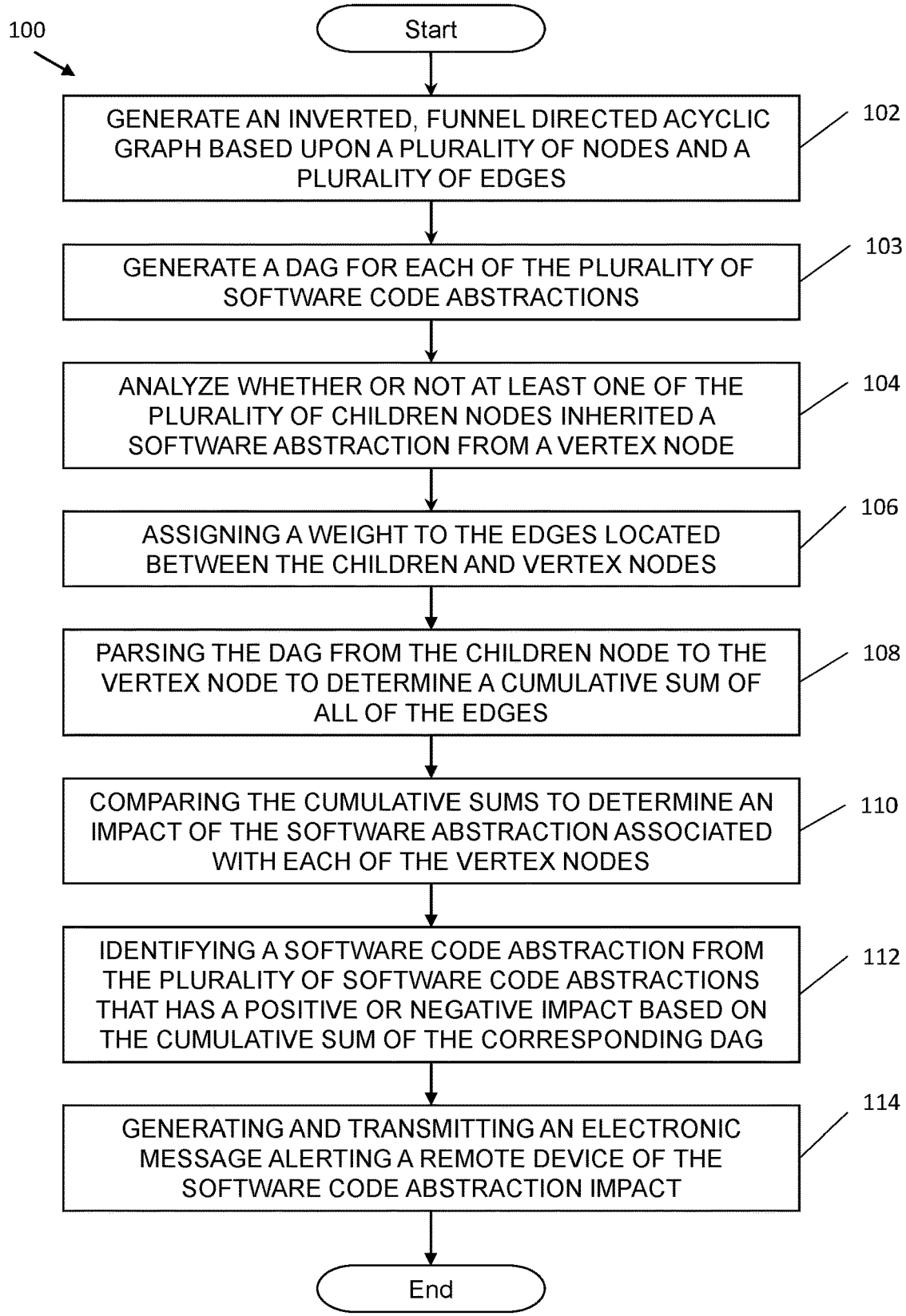
FIG. 1 illustrates one embodiment for a method for the valuation of software abstractions using the inverted funnel, directed acyclic graph.

Systems and methods are described herein that implement a technique for evaluating software abstractions using at least an inverted funnel, directed acyclic graph (DAG). In one embodiment, the present technique is implemented into a software abstraction evaluation tool and is built on the principle of inheritance. Inheritance is the mechanism of basing an object or class upon another object (prototype-based inheritance) or class (class-based inheritance), thereby retaining similar implementations between the objects or classes. Furthermore, inheritance can include deriving new classes (sub-classes) from existing classes, such as a super (uber) class or base class and then forming the uber class and the new classes into a hierarchy of classes. In one embodiment, the hierarchy of classes may be in the form of an inverted funnel, directed acyclic graph. For example, all of the new classes (children) of the uber class (parent) inherit at least a portion of a software code from the uber class. Thus, an analysis of the inheritance of a portion of a software code from the uber class (parent) to the new classes (children) provides a roadmap of how a particular software code is passed from the uber class to the new classes, which amounts to an improvement over prior techniques since they did not operate in this manner.

In one embodiment, software abstractions are created by a process of removing irrelevant or unimportant information and details (e.g., physical details, spatial details, or temporal details) from a software system or software object. The abstraction may be created by a software developer who decides what information/details to remove. The abstraction can be regarded as a simplified version of the original software. Thus, the abstraction allows another user or other system (who is working with or programming the software) to focus attention on details of greater importance that have not been removed. One goal of the abstraction is to handle complexity of a software programming language by hiding unnecessary details from the user. Thus, the use of abstractions enables the user to implement more complex logic on top of the provided abstraction without understanding or even thinking about all the hidden complexity. This is another improvement and practical application of the present system and method.

A software abstraction evaluation method that is described herein, in one embodiment, is performed by a software-implemented tool that evaluates abstractions from one or more software modules and marks/identifies selected software modules as more valuable than other software modules based on inheritance. Based on the inheritance evaluation, a metric is generated. The generated metric may be used to value the abstractions. In one embodiment, the software abstraction evaluation method/tool identifies software modules based on directed acyclic graph (DAG) cumulative values, identifies a software code abstraction from the plurality of software code abstractions that has a positive impact or a negative impact based on at least the cumulative sum of the corresponding DAG, and then generates and transmits an electronic message alerting a remote device of the identified software code abstraction impact. As a result, the software abstraction evaluation method using inheritance techniques provides significant savings in hardware cost and reductions of computation time (less computing resource usage). Thus, these are improvements to previous hardware systems, as achieved by the present system and method, which amount to a practical application.

Moreover, the software abstraction evaluation method monitors the inheritance of software code abstractions. The inheritance is used to identify other software nodes that use the inherited code. Thus, the inheritance allows for tracking of any propagated bugs to other software nodes. So, if a computer "bug" in particular software code has been detected, any new classes (children nodes) of the uber class (parent node) from which the computer software code was inherited can be quickly identified by the present system and method. Then a "debugging" can be performed on and/or provided to the uber class and the new classes. For at least these reasons, the present system and method implement a practical application for these technical solutions to a technical problem.

With reference to FIG. 1, a computer-implemented method 100 is illustrated that describes one embodiment for evaluating software abstractions using an inverted funnel, directed acyclic graph (DAG). The method 100 is performed by at least a processor of a computer system that accesses and interacts with memories and/or data storage devices. For example, the processor at least accesses and reads/writes data to the memory and processes network communications to perform the actions of FIG. 1.

Figure 2:
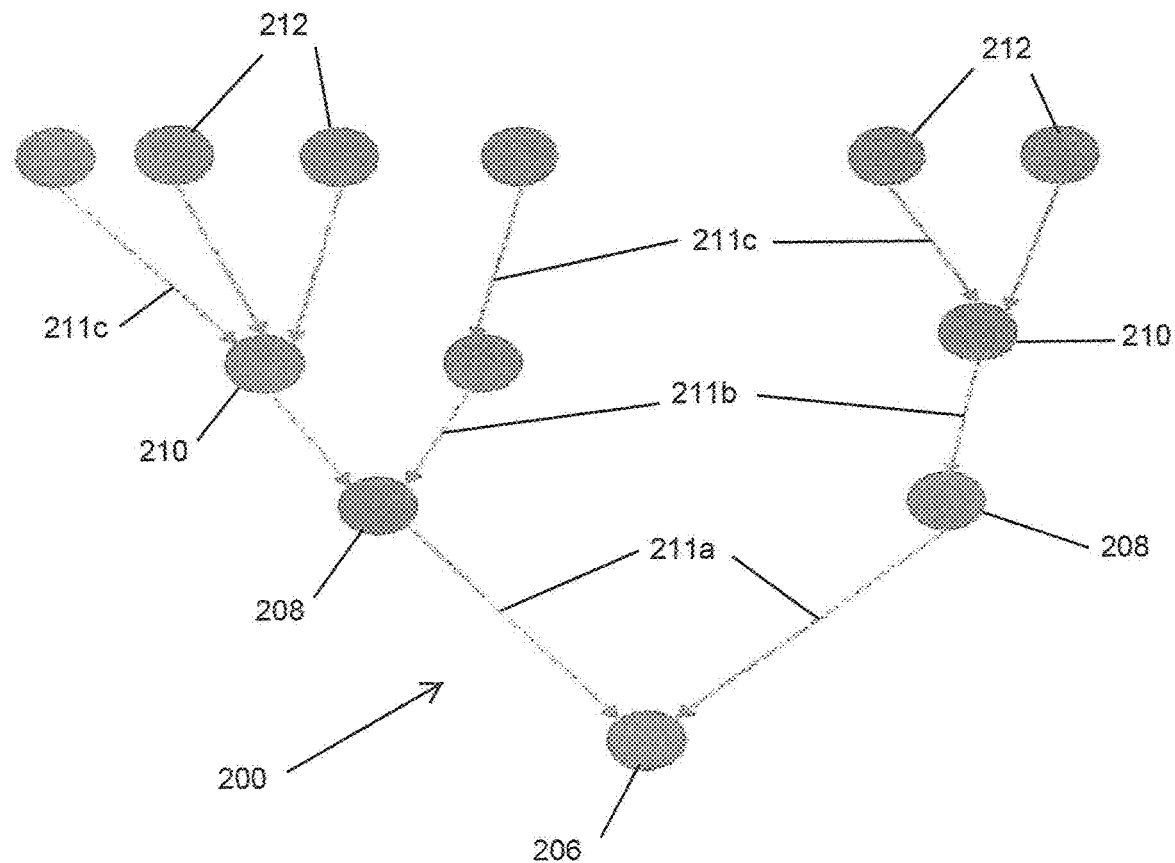
FIG. 2 is a graphical illustration of an inverted funnel, directed acyclic graph having multiple abstraction sources leading to multiple inheritances of the abstractions.

With continued reference to FIG. 1, at 102, the method 100 is initiated when the system administrator generates an inverted funnel, directed acyclic graph (DAG). An example inverted funnel DAG 200 is shown in FIG. 2. The DAG 200 comprises an abstraction nodes 206 leading to multiple children 208 and 210. Each abstraction nodes is a vertex node 6, which is shown at the bottom since the DAG 200 is inverted. Each vertex node 206 which is associate with a software code abstraction forms the basis of its own DAG of children nodes 208 and 210 that have inherited the software code abstraction from the abstraction node 206 (vertex node). The multiple children nodes 212 at the top are the leaf nodes. The edges 211a-211c are connected between the abstraction nodes 206 and the children nodes 208-212, respectively and represent dependency relationships (inheritance) between connected children nodes 208, 210, and 212 and the abstraction node 206. It is to be understood that there may be several DAGs such that each DAG includes an abstraction node and children nodes connected to the abstraction node and other children nodes by edges. Furthermore, each abstraction node is associated with a software code abstraction. In this manner, the various DAGs can be evaluated to determine the impact that a particular software code abstraction has on a particular DAG in comparison to what other software code abstractions have on other DAGs.

With respect to the generation of the inverted funnel, directed acyclic graph comprising a plurality of abstraction nodes (vertex nodes), children nodes, and a plurality of edges, attention is directed to FIG. 2. As shown in FIG. 2, an inverted funnel, directed acyclic graph (DAG) 200 with multiple abstraction nodes 206 (vertex or uber nodes) leading to multiple new (children) nodes 208, 210, and 122 is illustrated. The abstraction nodes 206 are the sources of software code abstractions and the children nodes 208, 210, and 212 are multi-level inheritances of those abstractions. Each of the abstraction nodes 206 forms an uber vertex. Edges 211a, 211b, and 211c are also shown, wherein the edges 211a-211c are connection links between the nodes 206, 208, 210, and 212 and represent dependency relationships between the abstraction nodes 206 and the children nodes 208, 210 and 212. It is to be understood that any node 206, 208, 210, and 212 in the DAG 200 can either be an implementation or definition. The DAG 200 is indifferent to the nature of logic that is present at each node 206, 208, 210, and 212. This has an impact that, irrespective of the presence of logic, allows the DAG 200 to weigh each node equally.

Returning back to FIG. 1, in 103, a DAG 200 is generated for each of the plurality of software code abstractions that are associated with an abstraction node. As discussed above, there may be several DAGs such that each DAG includes an abstraction node and children nodes connected to the abstraction node by the edges. In this manner, the various DAGs can be evaluated to determine the impact that a particular software code abstraction has on a particular DAG in comparison to what other software code abstractions have on other DAGs. In one embodiment, the DAG is generated by parsing the inheritances on the software code.

As shown in FIG. 1, in 104, the goal of this step is to analyze whether or not at least one of a plurality of children nodes 208, 210 and 212 inherited the software code abstraction from at least one of the plurality of the abstraction nodes 206. The analysis is conducted by performing a breadth first search through the nodes of the DAG that is generated.

Figures 3A, 3B, 3C:
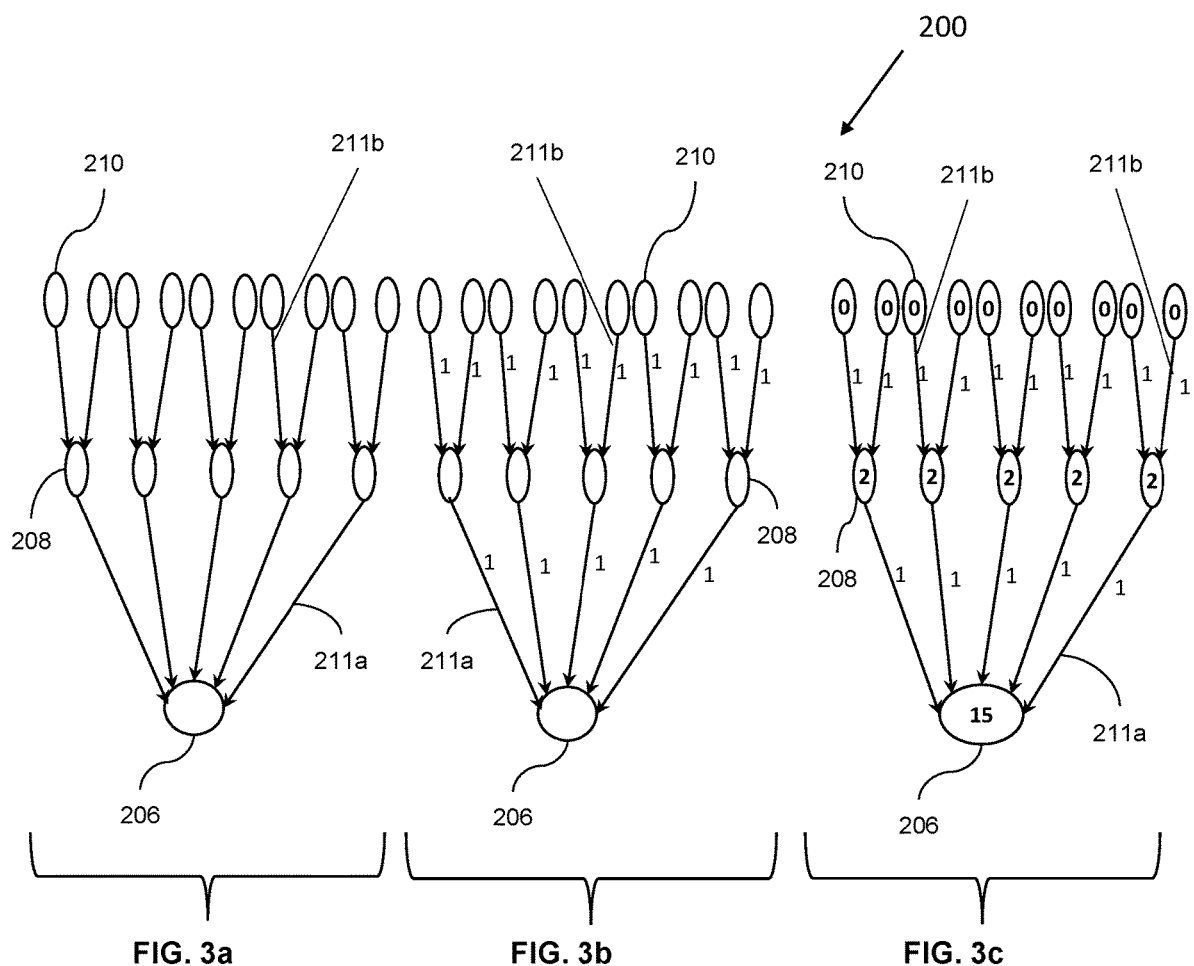
FIG. 3a is a graphical illustration of the inverted funnel, directed acyclic graph, constructed to analyze the inheritance in the abstraction code.
FIG. 3b is a graphical illustration of the inverted funnel, directed acyclic graph of FIG. 3a with a weight being assigned to every edge in the directed acyclic graph.
FIG. 3c is a graphical illustration of the inverted funnel, directed acyclic graph of FIG. 3b after the directed acyclic graph has been parsed to determine a cumulative sum of the edges from the leaves to the uber node.

With respect to the analyzing whether or not at least one of a plurality of children nodes 208, 210 and 212 inherited the software code abstraction from at least one of the plurality of the abstraction nodes 206, attention is directed to FIG. 3a. As shown in FIG. 3a, the inheritance of a software code abstraction from the abstraction nodes 206 to the multiple new (children) nodes 208 and 210 is illustrated. In particular, it is assumed that the software abstraction from abstraction node 206 has been inherited by children nodes 208, as shown by edge 211a. Also, the software abstraction has been inherited by children nodes 210 from children nodes 208, as shown by edges 211b. As shown in FIG. 2, the software abstraction has been inherited by children nodes 212 from children nodes 210, as shown by edges 211c. Children nodes 212 have not been shown in FIG. 3a in order to minimize the complexity of the discussion of the inheritance of the software code abstraction from the abstraction node 206 to the children nodes 208, 210, and 212.

Based upon the search and analysis of the inverted funnel, directed acyclic graph (DAG) 200, as shown in FIGS. 2 and 3a, the software abstraction evaluation method/tool can determine if at least one of a plurality of children nodes 208, 210, and 212 inherited the software code abstraction from at least one of the plurality of abstraction (vertex) nodes 206. It is important to determine the inheritance of software code abstractions from an abstraction node 206 to a child node 208, 210, and 212 so that if an issue arises with respect to the software code abstraction, the system administrator is able to quickly identify which children nodes 208, 210, and 212 may be affected by that particular code abstraction, which is a practical application of a technical solution to a technical problem.

Returning back to FIG. 1, in 106, once the inverted funnel, directed acyclic graph (DAG) 200 has been created and the inheritance of the software code abstractions from an abstraction node 206 to the children nodes 208 and 210 (in FIG. 3a) (and 212 in FIG. 2) have been identified by the edges 211a and 211b (11c in FIG. 2), a weight is assigned to the edges 211a and 211b (FIG. 3b) located between the abstraction nodes 206, the children nodes 208, and the children nodes 210. The weight to be assigned can come in the form of a pre-designated numerical value being assigned to a particular edge based upon the location of the edge with respect to the abstraction node 206 and the children node 208 and with respect to the children nodes 208 and 210 (and 212 in FIG. 2), as will be discussed in greater detail later.

With respect to the assigning a weight to the edges 211a and 211b located between the abstraction nodes 206, the children nodes 208, and the children nodes 210, attention is directed to FIG. 3b. It is to be understood that while only edges 211a and 211b are shown in FIG. 3b, the weight could also be assigned to edge 211c (FIG. 2) in a similar manner.

Returning back to FIG. 1, in 108, after the weight is assigned to the edges 211a and 211b located between the abstraction nodes 206, the children nodes 208, and the children nodes 210, the inverted funnel, directed acyclic graph (DAG) 200 is parsed downwardly (e.g. traversed, navigated) starting from the children nodes 210 (leaf nodes). The parsing and navigation continues to the children nodes 208 and to the abstraction node 206 (vertex node) by performing a depth first search pushing down the cumulative sum of edges from the leaf nodes 210 to the abstraction node 206 (vertex node) to determine a cumulative sum of all of the edges 211a and 211b. In other words, all of the numerical values assigned to the edges 211a and 211b are added and the total of all of those values is the cumulative sum of all of the edges 211a and 211b, as will be discussed in greater detail later.

With respect to parsing and traversing downwardly from the children nodes 210 (leaf nodes) to children nodes 208 to the abstraction node 206 to determine a cumulative sum of all of the edges 211a and 211b and the nodes 206, 208, and 210, attention is directed to FIG. 3c. As shown in FIG. 3c, children nodes 210 (leaf nodes 210) have a zero value. This is because the abstraction has not been transferred from children nodes 210 to any other children in FIG. 3c. The final result is a cumulative sum of all the edges 211a and 211b that ultimately funnel down to a particular abstraction node 206 (vertex node 206). This cumulative sum represents the relative value of the abstraction node 206. A side effect is that intermediate children nodes 208 and 210 also have cumulative sums, thus representing the value of these children nodes 208 and 210. This cumulative sum (which may be determined for each software abstraction that is evaluated) functions as a metric for valuing an abstraction relative to a threshold and/or to other abstractions.

With respect to determining the cumulative sum at each abstraction node 206, the recursion for value function $f(V)$ at node V can be stated as follows:

$$f(V) = \sum_{a}^{b} e + f(v) \forall e{:}v \rightarrow V,$$  (Eq. 1)

where b is the branching factor of V=0 if □=0

It is to be understood that it may seem counter intuitive that the children nodes 210 (leaf nodes) have no value, this is due to the fact that the inverted funnel, directed acyclic graph 200 emphasizes the contribution via inheritance of the abstraction node 6 on the derived logic, as discussed above. Thus, the greater the branching factor at a node, the higher the funnel velocity of edges flowing into the node.

Returning back to FIG. 1, in 110, after the inverted funnel, directed acyclic graph 200 is parsed from the children nodes 210 to the children nodes 208 to the abstraction node 206, the cumulative sums associated with each of the at least one of a plurality of abstraction nodes 206 are compared. The cumulative sums are compared to determine an impact ("impact radius") of the software abstraction associated with each of the abstraction nodes 206 in relation to the other abstraction nodes 206 and the software code abstractions associated with those other abstraction nodes 206.

Figure 5:
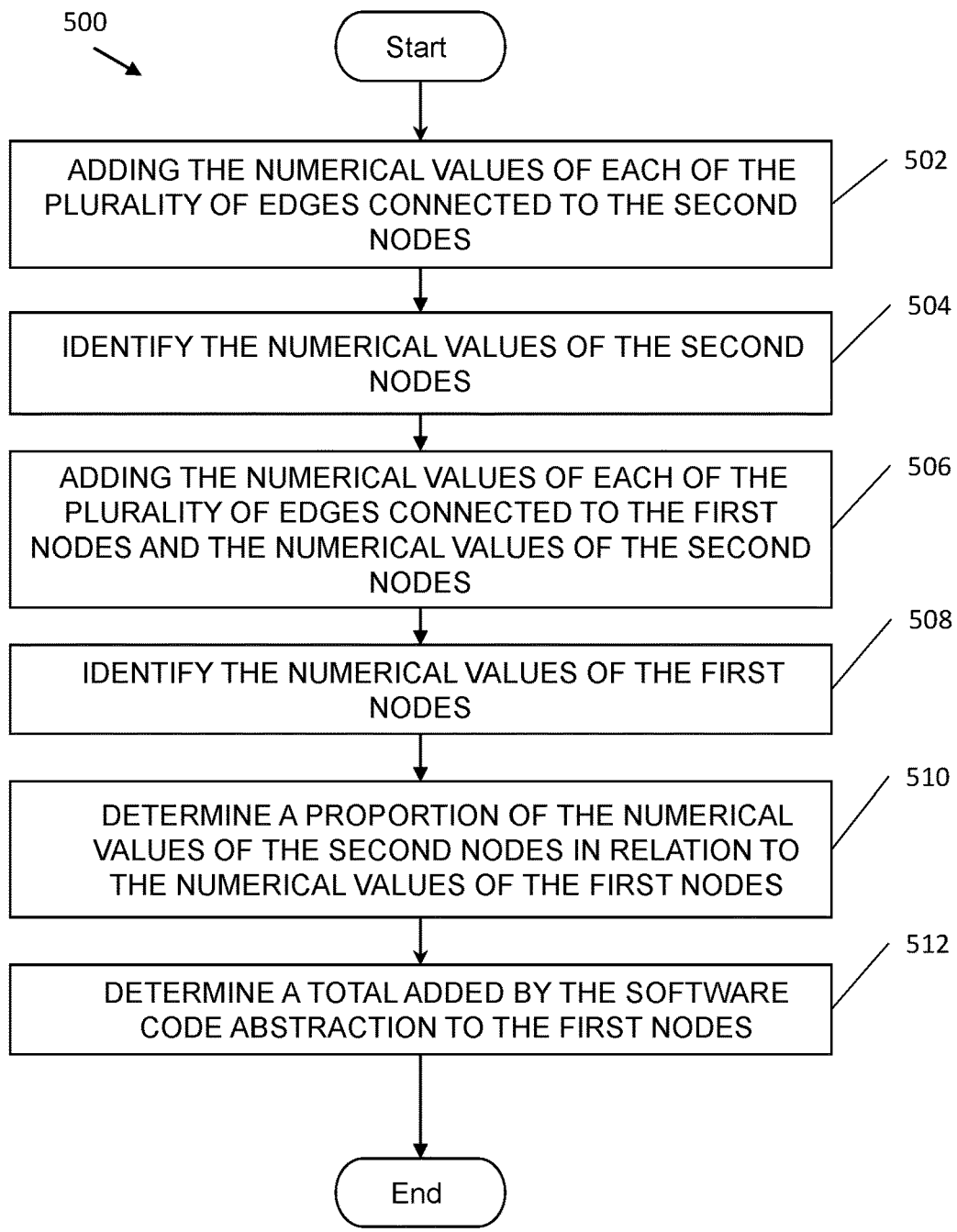
FIG. 5 illustrates one embodiment for a method for determining a total value added by the software abstraction.

With respect to comparing the cumulative sums associated with each of the at least one of a plurality of abstraction nodes 206 and children nodes 208 and 210 to determine an impact ("impact radius") of the software abstraction associated with each of the abstraction nodes 206 and their associated children nodes 208 and 210, attention is directed to FIG. 5. Once the inverted funnel, directed acyclic graph 200 has been constructed, the next step is to compute the total value of the software abstraction. The system and method for evaluating software abstractions using the inverted funnel, directed acyclic graph leverages the fact that each of the intermediate nodes 208, 210 (and 212 in FIG. 2) potentially represents a business application with a well-defined value.

As shown in FIG. 5, the step 110 of comparing the cumulative sums associated with each of the at least one of a plurality of abstraction nodes (vertex nodes) 206 and their associated children nodes 208 and 210 to determine an impact of the software abstraction associated with each of the abstraction nodes 206 and their associated children nodes 208 and 210 also includes a method 500 to translate cumulative sums into real values.

Figure 4:
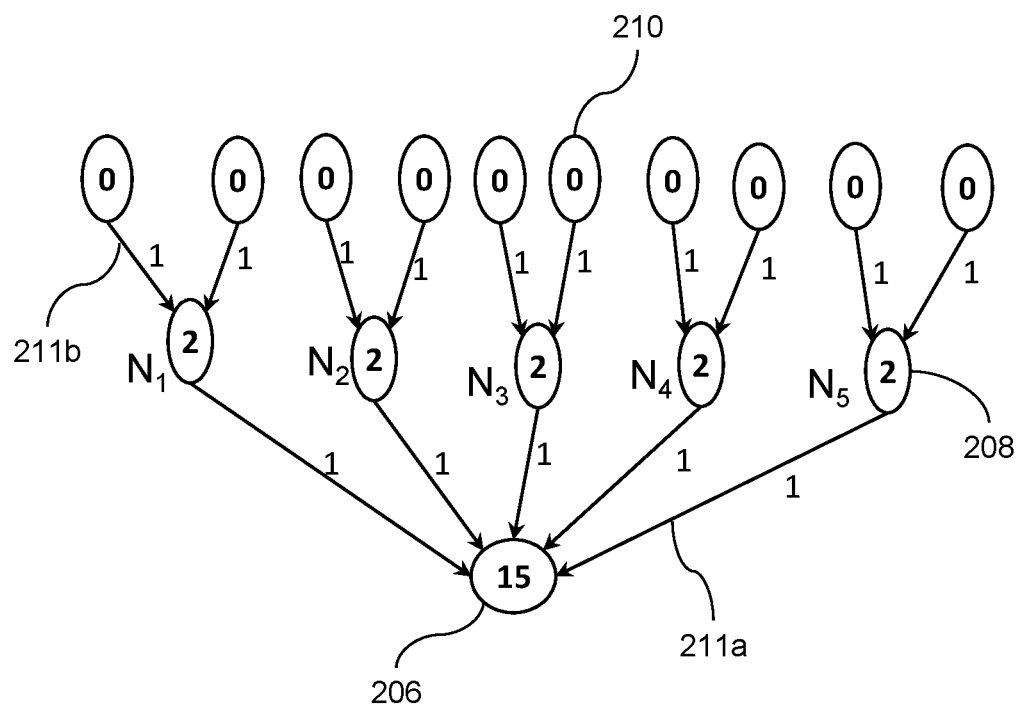
FIG. 4 is a graphical illustration of the inverted funnel, directed acyclic graph showing the nodes that benefit from (inherited) the software code abstraction from the uber node.

As shown in FIG. 5, the method 500 to translate cumulative sums into real values is initiated, at 502, by adding the numerical values of each of the plurality of edges 211a and 211b (FIGS. 3c and 4) that are connected to the at least one of a plurality of intermediate nodes (such as children nodes 208 and 210, as shown in FIGS. 3c and 4).

After the numerical values of each of the plurality of edges 211a and 211b (FIGS. 3c and 4) that are connected to the at least one of a plurality of intermediate nodes (such as children nodes 208 and 210, as shown in FIGS. 3c and 4) have been added, in 504, the numerical values of the at least one of a plurality of intermediate nodes based upon the numerical values of each of the plurality of edges that are connected to the at least one of a plurality of intermediate nodes are identified.

In 506, the numerical values of each of the plurality of edges 211a and 211b (FIGS. 3c and 4) that are connected to the at least one of a plurality of abstraction nodes 206 (vertex nodes) and the numerical values of the at least one of a plurality of intermediate nodes (such as children nodes 208 and 210, as shown in FIGS. 3c and 4) are added.

After the numerical values of each of the plurality of edges 211a and 211b (FIGS. 3c and 4), that are connected to the at least one of a plurality of abstraction nodes 206 (vertex nodes) and the numerical values of the at least one of a plurality of intermediate nodes (such as children nodes 208 and 210, as shown in FIGS. 3c and 4), are added, in 508, the numerical values of the at least one of a plurality of abstraction nodes 206 (vertex nodes) based upon the numerical values of each of the plurality of edges 211a and 211b, that are connected to the at least one of a plurality of abstraction nodes 206 (vertex nodes) and the numerical values of the at least one of a plurality of intermediate nodes, are identified.

After the values of the abstraction nodes 206 (vertex nodes) have been determined, in 510, the contribution of the value of each intermediate node (such as children nodes 208 and 210) is allocated as a proportion of the abstraction node 206 (vertex node). In particular, a proportion of the numerical values of the at least one of a plurality of intermediate nodes in relation to a numerical value of the at least one of a plurality of abstraction node 206 (vertex node) is determined.

Once the contribution of the value of each intermediate node (such as children nodes 208 and 210) is allocated as a proportion of the abstraction node 206 (vertex node), in 512, the value at each intermediate node is propagated to the abstraction node 206 (vertex node). In particular, a total added by the software code abstraction to the abstraction nodes 206 (vertex nodes) is determined. The final resulting value of the abstraction node 206 (vertex node) represents the total value added (e.g., impact) by the software abstraction to an abstraction node 206 and those children nodes 208, 210 (and 212 in FIG. 2) that receive the software code abstraction from a particular abstraction node 206.

The ability to determine the total value added by the software abstraction to an abstraction node 206 and those children nodes 208 and 210 (and 212 in FIG. 2) that receive the software code abstraction from a particular abstraction node 206 allows the system administrator to determine how much of an affect ("impact radius") a particular software code abstraction may have on an abstraction node and those children nodes 208 and 210 (and 212 in FIG. 2) that receive the software code abstraction from a particular abstraction node 206. In this manner, if an issue arises with respect to the software code abstraction, the system administrator is able to quickly identify which abstraction nodes 206 and children nodes 208 and 210 (and 12 in FIG. 2) may be affected by that particular code abstraction ("impact radius") so that the software code abstraction can be edited or removed ("debugged"), which is a practical application of a technical solution to a technical problem.

To further discuss the determination of the total value added by the software abstraction to an abstraction node 206 and those children nodes 208 and 210 (and 212 in FIG. 2) that receive the software code abstraction from a particular abstraction node 206, attention is directed to FIG. 4. As shown in FIG. 4, let $N_{1...5}$ represent the children nodes 208 and 210 that benefit from a software code abstraction provided by abstraction node 206 (vertex node) (in this example referred to as $N_U$). Let $X_{1...5}$ represent the overall value for $N_{1...5}$, respectively. Then the contribution □ of overall value X towards N for every intermediate node i can be represented as:

$$vi = Xi * (N_i/N_U) \quad \text{Eq. 2}$$

The actual value vU for the vertex (uber) node $N_U$ can be computed as:

$$vU = \Sigma_{n=1}^{N} v_n \quad \text{Eq. 3}$$

Returning back to FIG. 1, once the final resulting value of the abstraction node 206 (vertex node) that represents the total value added by the software abstraction to an abstraction node 206 and those children nodes 208 and 210 (and 212 in FIG. 2) that receive the software code abstraction from a particular abstraction node 206 has been determined, in 112, a software code abstraction from the plurality of software code abstractions is identified that has a positive impact or a negative impact (e.g., on an overall software system) based on at least the cumulative sum of the corresponding DAG.

For example, the software code abstraction may have a negative impact on a system if it has at least one bug that propagates to the inherited software code abstraction in the child nodes 208, 210 (and 212, in FIG. 2). If this negative impact occurs, this may cause the technical errors ("bugs") to propagate to many different software system components. Conversely, the software code abstraction may have a positive impact if the software code abstraction has not been inherited by too many child nodes. Also, the software code abstraction may have a positive impact if it does not have any bugs. In this manner, a positive impact may reflect that while the child nodes 208, 210, (and 212, in FIG. 2) may have inherited the software code abstraction node 206, since the software code abstraction does not have any "bugs", the final resulting value of the abstraction node 206 may be an indication of this positive impact.

In one embodiment, determining whether a cumulative sum represents a positive impact or negative impact may be determined from observed tests and evaluations of software code. The evaluations may be performed to identify software modules that are actually positive and/or valuable to a software system and identify other software modules that are negative and/or have a low value to the system. Based on these observations and the associated sums generated for the evaluated software modules, a threshold range may be defined for cumulative sum values that represents a positive impact and a threshold range that represents a negative impact. A single threshold may also be designated to identify cumulative sum values that are above or below the threshold.

Referring again to FIG. 1 at block 114, an electronic message is generated and transmitted to a remote device alerting the system administrator associated with the remote device of the identified abstraction node (vertex node) and its associated software code abstraction, wherein the electronic message includes information related to the impact of the identified software code abstraction on the abstraction node (vertex node). In this manner, the system administrator can determine how much of an affect a particular software code abstraction may have on an abstraction node (vertex node) and those child nodes that receive the software code abstraction from a particular abstraction node ("impact radius").

The above-described technique for the evaluation and valuation of software abstractions using a directed acyclic graph technique can be used to decide on various aspects of software.

In one embodiment, identifying software abstractions that have a positive impact may be used to reduce a fixed cost overhead by distributing the software abstractions among the children 208, 210, and 212 (FIG. 2). By better understanding the contributions of the software abstractions, the fixed costs can be properly computed and, thus, can have an impact on pricing and/or margin calculation of software.

In another embodiment, valuing software abstractions may help in evaluating the contribution of these abstractions to an overall revenue of a system. Thus, an informed decision can be made in terms of future investment in projects that create such abstractions. Furthermore, having this technique of evaluating software abstractions also may help to determine the value addition and viability of such investments.

Hotspot Detection

While abstractions modularize logic and improve maintainability of software, any quality issues arising from "bugs" in the abstraction tend to have a bigger blast radius or impact radius. By properly valuating the contributions of the abstraction to different business units, hotspot detection is possible, thus allowing testing to be targeted to an area that has a greater impact (greater impact radius) on business operations and computer system continuity.

Computing Device Embodiment

Figure 6:
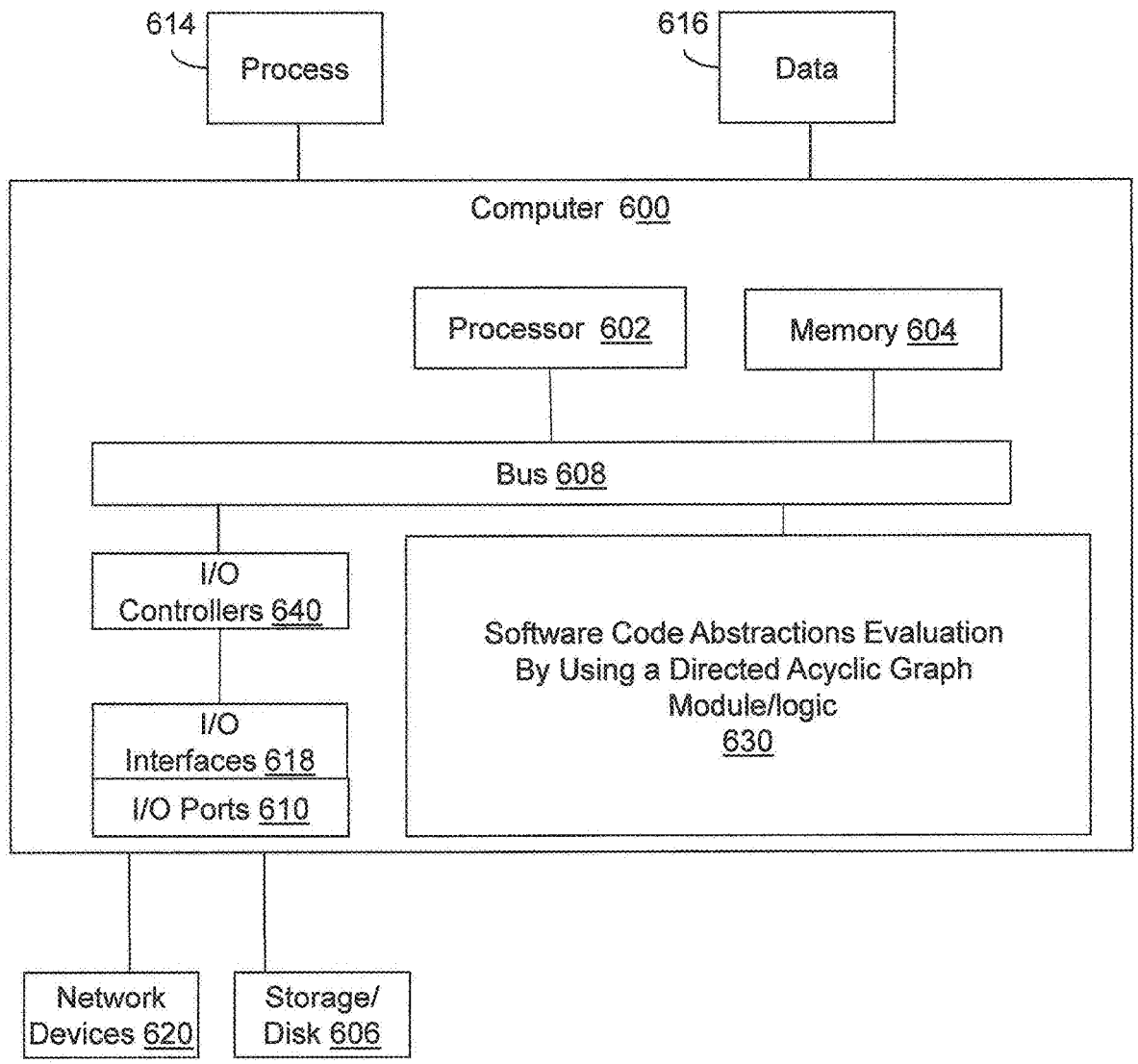
FIG. 6 illustrates an embodiment of a special purpose computing system configured with the example systems and/or methods disclosed.

FIG. 6 illustrates an example special purpose computing device that is configured and/or programmed with one or more of the example systems and methods described herein, and/or equivalents. The example computing device may be a computer 600 that includes a processor 602, a memory 604, and input/output ports 610 operably connected by a bus 608. In one example, the computer 600 includes and is configured with a software code abstractions evaluation module/logic 630 that is configured to perform the methods of FIGS. 1 and/or 5. As previously described, the abstractions evaluation module/logic 630 is configured to provide an evaluation of the inheritance of software abstractions from an abstraction node (uber node) to children nodes, as performed by the method of FIGS. 1 and 5. In different examples, the logic 630 may be implemented in hardware, a non-transitory computer-readable medium with stored instructions, firmware, and/or combinations thereof. While the logic 630 is illustrated as a hardware component attached to the bus 608, it is to be appreciated that in other embodiments, the logic 630 could be implemented in the processor 602, stored in memory 604, or stored in disk 606.

In one embodiment, logic 630 or the computer is a means (e.g., structure: hardware, non-transitory computer-readable medium, firmware) for performing the actions described. In some embodiments, the computing device may be a special purpose server operating in a Cloud computing system, a server configured in a Software as a Service (SaaS) architecture, a smart phone, laptop, tablet computing device, and so on.

Describing an example configuration of the computer 600, the processor 602 may be a variety of various specially programmed processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A storage disk 606 may be operably connected to the computer 600 via, for example, an I/O controller 640, an input/output (I/O) interface (e.g., card, device) 618 and an input/output port 610. The disk 606 may be, for example, a magnetic disk drive, a solid-state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The computer 600 may interact with input/output (I/O) devices via the I/O controller 640, the I/O interfaces 618, and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the I/O controller 640, the I/O interfaces 618, and/or the I/O ports 610. Through the network devices 620, the computer 600 may interact with a network. Through the network, the computer 600 may be logically connected to remote computers. Networks with which the computer 600 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a Cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101. It is inconsistent with the present disclosure to interpret that any of the functions performed and/or claimed herein can be performed in the human mind or manually.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor specially programmed with an algorithm for performing the disclosed methods, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A method comprising:
    generating a directed acyclic graph (DAG) for each of a plurality of software code abstractions, wherein each DAG comprises a vertex node, a plurality of children nodes, and a plurality of edges connected therebetween, wherein the vertex node represents the software code abstraction, and wherein the plurality of edges represent dependency relationships between the vertex node and the plurality of children nodes;
    for each DAG:
        analyzing whether or not at least one of the plurality of children nodes inherited the software code abstraction from the vertex node to determine that the at least one of the plurality of children nodes inherited the software code abstraction from the vertex node;
        upon determining that the at least one of the plurality of children nodes inherited the software code abstraction from the vertex node, assigning a weight to the plurality of edges located between the vertex node and the at least one of the plurality of children nodes that inherited the software code abstraction from the vertex node; and
        parsing the DAG from the at least one of the plurality of children nodes to the vertex node to determine a cumulative sum of all of the plurality of edges located between the at least one of the plurality of children nodes and the vertex node;
    upon determining the cumulative sum of all of the plurality of edges, comparing cumulative sums for each DAG to determine an impact of the software code abstraction associated with each of a plurality of vertex nodes upon each of the plurality of children nodes in relation to other DAGs;

identifying a first software code abstraction from the plurality of software code abstractions that has a positive impact or a negative impact based on at least a cumulative sum of a corresponding DAG;

generating and transmitting an electronic message alerting a remote device of the impact of the software code abstraction, wherein the electronic message includes information related to the positive impact or the negative impact of the identified first software code abstraction from the plurality of software code abstractions; and in response to receiving the electronic message and upon determining that the identified first software code abstraction has a negative impact due to a presence of at least one software bug in the identified first software code abstraction that has propagated into the at least one of the plurality of children nodes that inherited the identified first software code abstraction from the vertex node, debugging the identified first software code abstraction to edit or remove the identified first software code abstraction in order to fix the at least one software bug.

2. The method of claim 1, wherein generating the DAG comprises:
generating each DAG as an inverted funnel DAG.

3. The method of claim 1, wherein analyzing whether or not the at least one of the plurality of children nodes inherited the software code abstraction from the vertex node comprises:
determining if at least one of the plurality of children nodes is connected to the vertex node by one of the plurality of edges.

4. The method of claim 1, wherein assigning the weight to the plurality of edges comprises:
assigning an edge value to each of the plurality of edges that is connected to at least one of the plurality of children nodes and the vertex node, wherein each edge value is a pre-designated numerical value.

5. The method of claim 4, wherein parsing the DAG from the at least one of the plurality of children nodes to the vertex node comprises:
adding the edge value of each of the plurality of edges that are connected between the at least one of the plurality of children nodes and the vertex node to determine the cumulative sum of all of the plurality of edges.

6. The method of claim 4, wherein comparing the cumulative sums for each DAG comprises:
adding the edge value of each of the plurality of edges that are connected to the at least one of the plurality of children nodes;
determining a child node value of the at least one of the plurality of children nodes based upon the edge value of each of the plurality of edges that are connected to the at least one of the plurality of children nodes;
adding i) the edge value of each of the plurality of edges that is connected to the vertex node and ii) the child node value of the at least one of the plurality of children nodes to generate a vertex node value;
determining a proportion of the child node value of the at least one of the plurality of children nodes in relation to the vertex node value; and
propagating the proportion of the child node value of the at least one of the plurality of children nodes in relation to the vertex node value to the vertex node to determine a total value added by the software code abstraction to the vertex node.

7. The method of claim 1, wherein generating and transmitting the electronic message comprises:
determining an impact radius of an affect that the software code abstraction has on the vertex node and the at least one of the plurality of children nodes.

8. A non-transitory computer-readable medium storing computer-executable instructions that, when executed by a computer including a processor, cause the computer to perform functions configured by the computer-executable instructions to:
generate a directed acyclic graph (DAG) for each of a plurality of software code abstractions, wherein each DAG comprises a vertex node, a plurality of children nodes, and a plurality of edges connected therebetween, wherein the vertex node represents the software code abstraction, and wherein the plurality of edges represent dependency relationships between the vertex node and the plurality of children nodes;
for each DAG:
analyze whether or not at least one of the plurality of children nodes inherited the software code abstraction from the vertex node to determine that the at least one of the plurality of children nodes inherited the software code abstraction from the vertex node;
upon determining that the at least one of the plurality of children nodes inherited the software code abstraction from the vertex node, assign a weight to the plurality of edges located between the vertex node and the at least one of the plurality of children nodes that inherited the software code abstraction from the vertex node; and
parse the DAG from the at least one of the plurality of children nodes to the vertex node to determine a cumulative sum of all of the plurality of edges located between the at least one of the plurality of children nodes and the vertex node;
upon determining the cumulative sum of all of the plurality of edges, compare cumulative sums for each DAG to determine an impact of the software code abstraction associated with each of a plurality of vertex nodes upon each of the plurality of children nodes in relation to other DAGs;
identify a first software code abstraction from the plurality of software code abstractions that has a positive impact or a negative impact based on at least a cumulative sum of a corresponding DAG;
generate and transmit an electronic message alerting a remote device of the impact of the software code abstraction, wherein the electronic message includes information related to the positive impact or the negative impact of the identified first software code abstraction from the plurality of software code abstractions; and
in response to receiving the electronic message and upon determining that the identified first software code abstraction has a negative impact due to a presence of at least one software bug in the identified first software code abstraction that has propagated into the at least one of the plurality of children nodes that inherited the identified first software code abstraction from the vertex node, debug the identified first software code abstraction to edit or remove the identified first software code abstraction in order to fix the at least one software bug.

9. The non-transitory computer-readable medium of claim 8, further comprising computer-executable instructions that, when executed by the computer, cause the computer to:
generate each DAG as an inverted funnel DAG.

10. The non-transitory computer-readable medium of claim 8, further comprising computer-executable instructions that, when executed by the computer, cause the computer to:
determine if at least one of the plurality of children nodes is connected to the vertex node by one of the plurality of edges.

11. The non-transitory computer-readable medium of claim 8, further comprising computer-executable instructions that, when executed by the computer, cause the computer to:
assign an edge value to each of the plurality of edges that is connected to at least one of the plurality of children nodes and the vertex node, wherein each edge value is a pre-designated numerical value.

12. The non-transitory computer-readable medium of claim 11, further comprising computer-executable instructions that, when executed by the computer, cause the computer to:
add the edge value of each of the plurality of edges that are connected between the at least one of the plurality of children nodes and the vertex node to determine the cumulative sum of all of the plurality of edges.

13. The non-transitory computer-readable medium of claim 11, further comprising computer-executable instructions that, when executed by the computer, cause the computer to:
add the edge value of each of the plurality of edges that are connected to the at least one of the plurality of children nodes;
determine a child node value of the at least one of the plurality of children nodes based upon the edge value of each of the plurality of edges that are connected to the at least one of the plurality of children nodes;
add i) the edge value of each of the plurality of edges that is connected to the vertex node and ii) the child node value of the at least one of the plurality of children nodes to generate a vertex node value;
determine a proportion of the child node value of the at least one of the plurality of children nodes in relation to the vertex node value; and
propagate the proportion of the child node value of the at least one of the plurality of children nodes in relation to the vertex node value to the vertex node to determine a total value added by the software code abstraction to the vertex node.

14. The non-transitory computer-readable medium of claim 8, further comprising computer-executable instructions that, when executed by the computer, cause the computer to:
determine an impact radius of an affect that the software code abstraction has on the vertex node and the at least one of the plurality of children nodes.

15. A computing system comprising:
at least one processor connected to at least one memory comprising a non-transitory computer: readable medium; and
an evaluation of software code abstractions module stored on the at least one memory and including instructions that, when executed by the at least one processor, cause the at least one processor to:
generate a directed acyclic graph (DAG) for each of a plurality of software code abstractions, wherein each DAG comprises a vertex node, a plurality of children nodes, and a plurality of edges connected therebetween, wherein the vertex node represents the software code abstraction, and wherein the plurality of edges represent dependency relationships between the vertex node and the plurality of children nodes;
for each DAG:
analyze whether or not at least one of the plurality of children nodes inherited the software code abstraction from the vertex node to determine that the at least one of the plurality of children nodes inherited the software code abstraction from the vertex node;
upon determining that the at least one of the plurality of children nodes inherited the software code abstraction from the vertex node, assign a weight to the plurality of edges located between the vertex node and the at least one of the plurality of children nodes that inherited the software code abstraction from the vertex node; and
parse the DAG from the at least one of the plurality of children nodes to the vertex node to determine a cumulative sum of all of the plurality of edges located between the at least one of the plurality of children nodes and the vertex node;
upon determining the cumulative sum of all of the plurality of edges, compare cumulative sums for each DAG to determine an impact of the software code abstraction associated with each of a plurality of vertex nodes upon each of the plurality of children nodes in relation to other DAGs;
identify a first software code abstraction from the plurality of software code abstractions that has a positive impact or a negative impact based on at least a cumulative sum of a corresponding DAG;
generate and transmit an electronic message alerting a remote device of the impact of the software code abstraction, wherein the electronic message includes information related to the positive impact or the negative impact of the identified first software code abstraction from the plurality of software code abstractions; and
in response to receiving the electronic message and upon determining that the identified first software code abstraction has a positive impact if the identified first software code abstraction does not have any software bugs, distribute the identified first software code abstraction among the at least one of the plurality of children nodes.

16. The computing system of claim 15, wherein the evaluation of software code abstractions module further includes instructions that, when executed by the at least one processor, cause the at least one processor to:
generate each DAG as an inverted funnel DAG.

17. The computing system of claim 15, wherein the evaluation of software code abstractions module further includes instructions that, when executed by the at least one processor, cause the at least one processor to:
determine if at least one of the plurality of children nodes is connected to the vertex node by one of the plurality of edges.

18. The computing system of claim 15, wherein the evaluation of software code abstractions module further includes instructions that, when executed by the at least one processor, cause the at least one processor to:
assign an edge value to each of the plurality of edges that is connected to at least one of the plurality of children nodes and the vertex node, wherein each edge value is a pre-designated numerical value.

19. The computing system of claim 18, wherein the evaluation of software code abstractions module further includes instructions that, when executed by the at least one processor, cause the at least one processor to:
add the edge value of each of the plurality of edges that are connected between the at least one of the plurality of children nodes and the vertex node to determine the cumulative sum of all of the plurality of edges.

20. The computing system of claim 18, wherein the evaluation of software code abstractions module further includes instructions that, when executed by the at least one processor, cause the at least one processor to:
add the edge value of each of the plurality of edges that are connected to the at least one of the plurality of children nodes;
determine a child node value of the at least one of the plurality of children nodes based upon the edge value of each of the plurality of edges that are connected to the at least one of the plurality of children nodes;
add i) the edge value of each of the plurality of edges that is connected to the vertex node and ii) the child node value of the at least one of the plurality of children nodes to generate a vertex node value;
determine a proportion of the child node value of the at least one of the plurality of children nodes in relation to the vertex node value; and
propagate the proportion of the child node value of the at least one of the plurality of children nodes in relation to the vertex node value to the vertex node to determine a total value added by the software code abstraction to the vertex node.

* * * * *

UNITED STATES PATENT AND TRADEMARK OFFICE
CERTIFICATE OF CORRECTION

PATENT NO. : 11,669,311 B2  
APPLICATION NO. : 17/344575  
DATED : June 6, 2023  
INVENTOR(S) : Swanand Rao Page 1 of 1

It is certified that error appears in the above-identified patent and that said Letters Patent is hereby corrected as shown below:

In the Specification

In Column 5, Line 61 (Approx.), Delete " $f(V) = \sum^b e + f(v) \forall e: v \rightarrow V,$ (Eq. 1) where b is the branching factor of V=0 if □=0 " and insert -- $f(V) = \sum^b_= e + f(v) \forall e: v \rightarrow V,$ where $b$ is the branching factor of V=0 if □=0 (Eq. 1) --.

In the Claims

In Column 15, Line 60, In Claim 15, delete "computer: readable" and insert -- computer-readable --.

Signed and Sealed this  
Thirty-first Day of December, 2024

Derrick Brent  
*Acting Director of the United States Patent and Trademark Office*